(12) United States Patent
Walden

(10) Patent No.: US 8,314,896 B1
(45) Date of Patent: Nov. 20, 2012

(54) PIVOTING REMOTELY CONTROLLED TELEVISION HOLDER APPARATUS

(76) Inventor: Mark L. Walden, Augusta, GA (US)

( * ) Notice: Subject to any disclaimer, the term of this patent is extended or adjusted under 35 U.S.C. 154(b) by 292 days.

(21) Appl. No.: 12/767,040

(22) Filed: Apr. 26, 2010

(51) Int. Cl.
H04N 5/64 (2006.01)
A47B 17/00 (2006.01)
(52) U.S. Cl. ......................... 348/843; 312/196
(58) Field of Classification Search .................. 348/843; 312/196
See application file for complete search history.

(56) References Cited

U.S. PATENT DOCUMENTS

| 5,124,805 | A | | 6/1992 | Chung et al. | |
|---|---|---|---|---|---|
| 5,401,089 | A | * | 3/1995 | Inagaki et al. | 312/7.2 |
| 5,634,622 | A | | 6/1997 | Pye | |
| 6,733,094 | B1 | * | 5/2004 | Chang | 312/7.2 |
| D517,085 | S | | 3/2006 | Deuschle | |
| 7,377,475 | B1 | | 5/2008 | Lopez | |
| 8,079,651 | B2 | * | 12/2011 | Cvek | 312/196 |
| 2007/0030405 | A1 | | 2/2007 | Childrey et al. | |

* cited by examiner

Primary Examiner — Jay Patel
Assistant Examiner — Richard Torrente

(57) ABSTRACT

The pivoting remotely controlled television holder apparatus provides for improved television viewing whether fitted with a flat screen television in one embodiment or a CTR television in an alternate embodiment. The pivoting remotely controlled television holder apparatus pivots a flat screen television in the vertical plane. The apparatus also pivots a television in the horizontal plane. The apparatus further raises and lowers a television. These pivoting, raising, and lowering functions are performed remotely via the remote. The alternate embodiment of the apparatus is suitable for a CTR television and offers side to side movement whereby the television is taken through an arc to pivot the viewing screen in the horizontal plane.

2 Claims, 8 Drawing Sheets

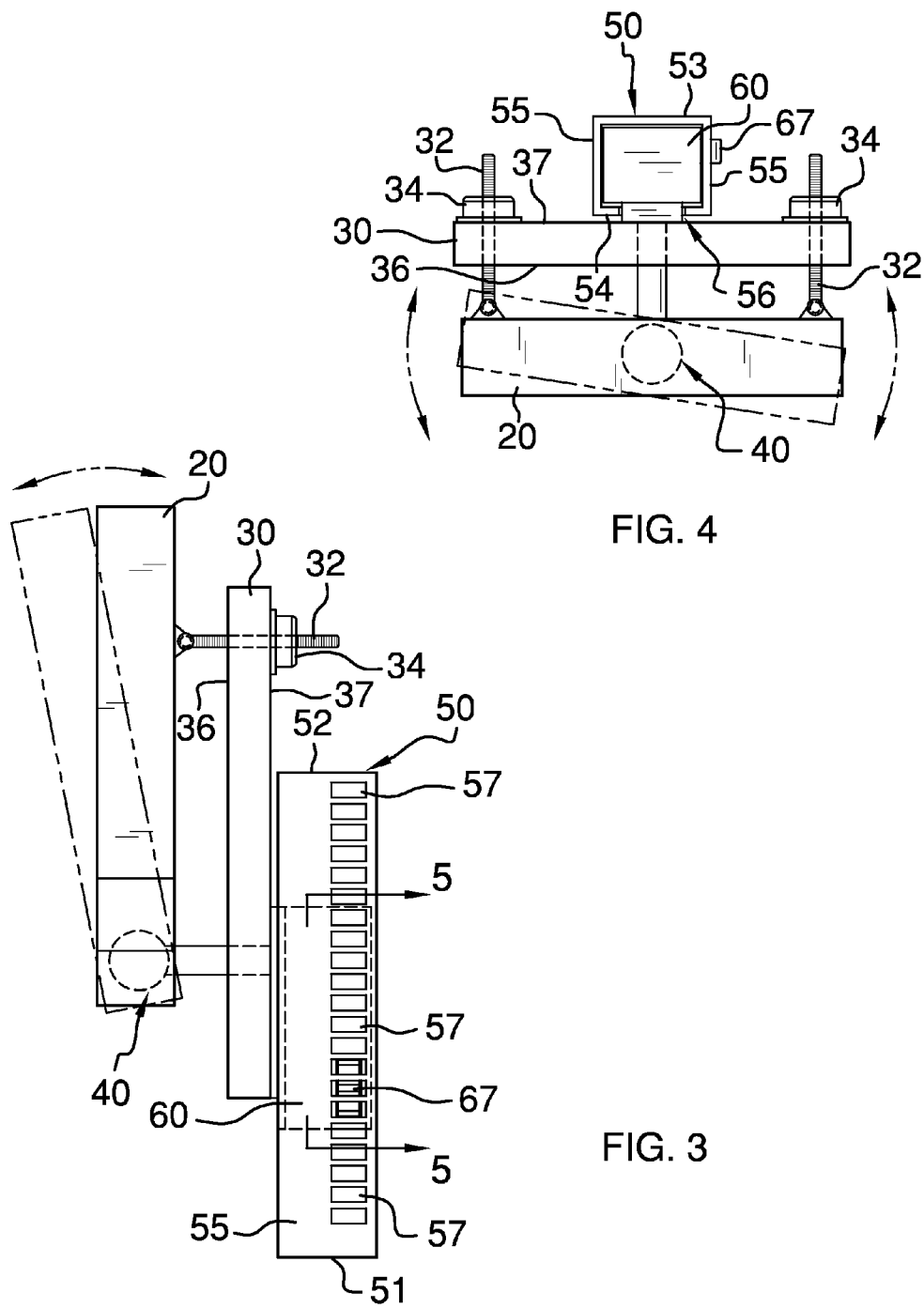

PIVOTING REMOTELY CONTROLLED TELEVISION HOLDER APPARATUS

BACKGROUND OF THE INVENTION

The various devices for supporting a television, whether flat screen or CTR, are testimony to the need for same. Of the various devices, few are remotely controlled. Of those that are, none offer the unique features of the present apparatus that provides for holding and remotely pivoting a television in the horizontal and vertical planes, as well as moving a television upwardly and downwardly.

FIELD OF THE INVENTION

The pivoting remotely controlled television holder apparatus relates to television supports and more especially to pivoting, raising, and lowering a television holder by remote control.

SUMMARY OF THE INVENTION

The general purpose of the pivoting remotely controlled television holder apparatus, described subsequently in greater detail, is to provide a pivoting remotely controlled television holder apparatus which has many novel features that result in an improved pivoting remotely controlled television holder apparatus which is not anticipated, rendered obvious, suggested, or even implied by prior art, either alone or in combination thereof.

To attain this, the apparatus provides for television movement whether fitted with a flat screen television in one embodiment or a CTR television in an alternate embodiment. The pivoting remotely controlled television holder apparatus pivots a television in the vertical plane. The apparatus also pivots a television in the horizontal plane. The apparatus further raises and lowers a television. These pivoting, raising, and lowering functions are performed remotely via the remote.

The alternate embodiment of the apparatus is suitable for a CTR television and offers side to side movement whereby the television is taken through an arc to pivot the viewing screen in the horizontal plane.

Thus has been broadly outlined the more important features of the improved pivoting remotely controlled television holder apparatus so that the detailed description thereof that follows may be better understood and in order that the present contribution to the art may be better appreciated.

An object of the pivoting remotely controlled television holder apparatus is to pivot a television in the vertical plane.

Another object of the pivoting remotely controlled television holder apparatus is to pivot a television in the horizontal plane.

Yet another object of the pivoting remotely controlled television holder is to raise and lower a television.

A further object of the pivoting remotely controlled television holder apparatus is to remotely pivot, raise, and lower a television.

These together with additional objects, features and advantages of the improved pivoting remotely controlled television holder apparatus will be readily apparent to those of ordinary skill in the art upon reading the following detailed description of presently preferred, but nonetheless illustrative, embodiments of the improved pivoting remotely controlled television holder apparatus when taken in conjunction with the accompanying drawings.

In this respect, before explaining the current embodiments of the improved pivoting remotely controlled television holder apparatus in detail, it is to be understood that the pivoting remotely controlled television holder apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved pivoting remotely controlled television holder apparatus. It is therefore important that the claims be regarded as including such equivalent constructions insofar as they do not depart from the spirit and scope of the pivoting remotely controlled television holder apparatus.

It is also to be understood that the phraseology and terminology employed herein are for purposes of description and should not be regarded as limiting.

BRIEF DESCRIPTION OF THE DRAWINGS

FIG. 3 is a lateral elevation view of the first embodiment.
FIG. 4 is a top plan view of the first embodiment.

DETAILED DESCRIPTION OF THE DRAWINGS

With reference now to the drawings, and in particular FIGS. 1 through 9 thereof, the principles and concepts of the pivoting remotely controlled television holder apparatus generally designated by the reference number 10 will be described.

Figure 1:
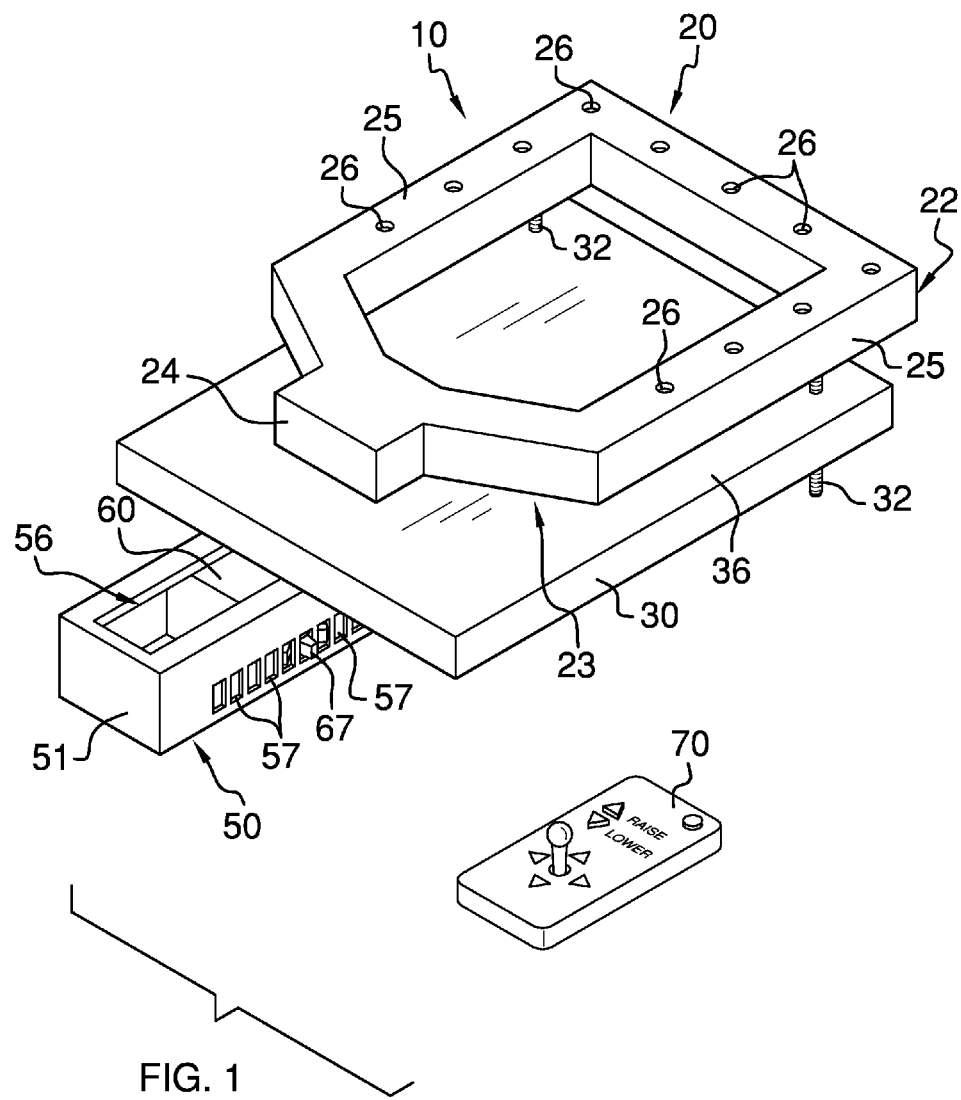
FIG. 1 is a perspective view of the first embodiment.

Referring to FIG. 1, the apparatus 10 partially comprises the hollow support bracket 20 having a first end 22 spaced apart from a v-shaped second end 23 and a pair of identical spaced apart sides 25. The extension 24 is extended outwardly from the v-shaped second end 23 in the same plane as the ends and sides 25. A plurality of spaced apart orifices 26 is disposed through the first end 22 and the pair of sides 25.

Figure 6:
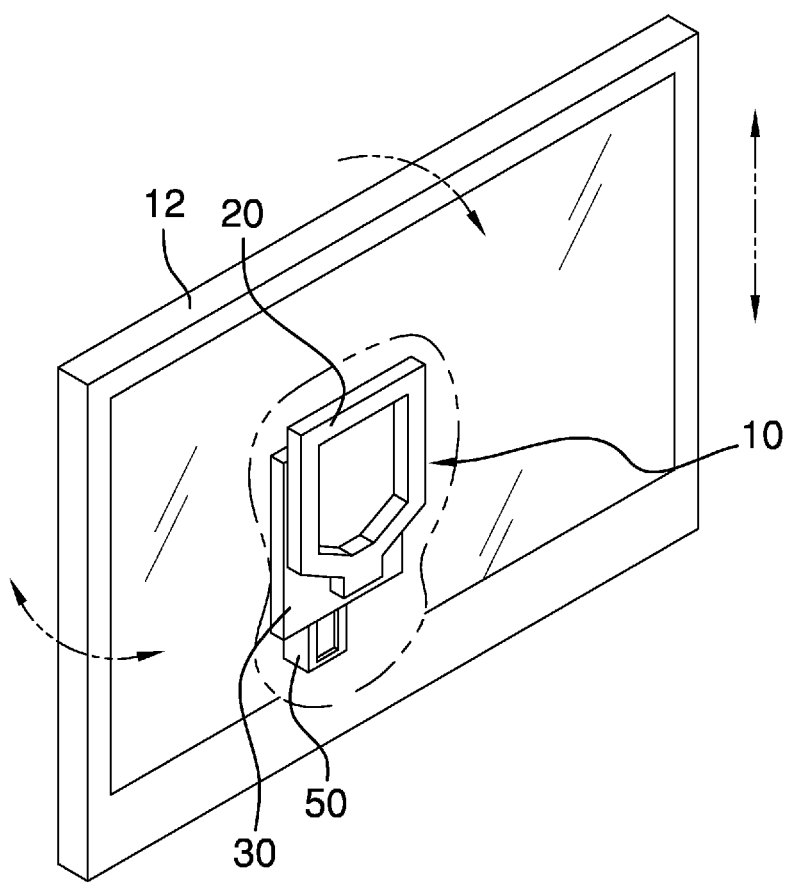
FIG. 6 is a partial cutaway view of the first embodiment in use with a flat screen television.

Referring to FIG. 6, the orifices 26 provide for support bracket 20 attachment to an existing flat screen television 12.

Referring to FIGS. 3 and 4, the back plate 30 has a first side 36 spaced apart from a second side 37. The back plate 30 is connected to the support bracket 20 by the pair of identical spaced apart worm screws 32 disposed within the support bracket 20 sides 25. The back plate 30 is further connected to the support bracket 20 by the pivot joint 40 partially disposed within the support bracket 20 extension 24. A screw motor 34 is disposed on each worm screw 32 and connected to the back plate 30 second side 37. The screw motors 34 thereby pivot the support bracket 20 in the vertical plane. The screw motors 34 further pivot the support bracket 20 in the horizontal plane.

Figure 2:
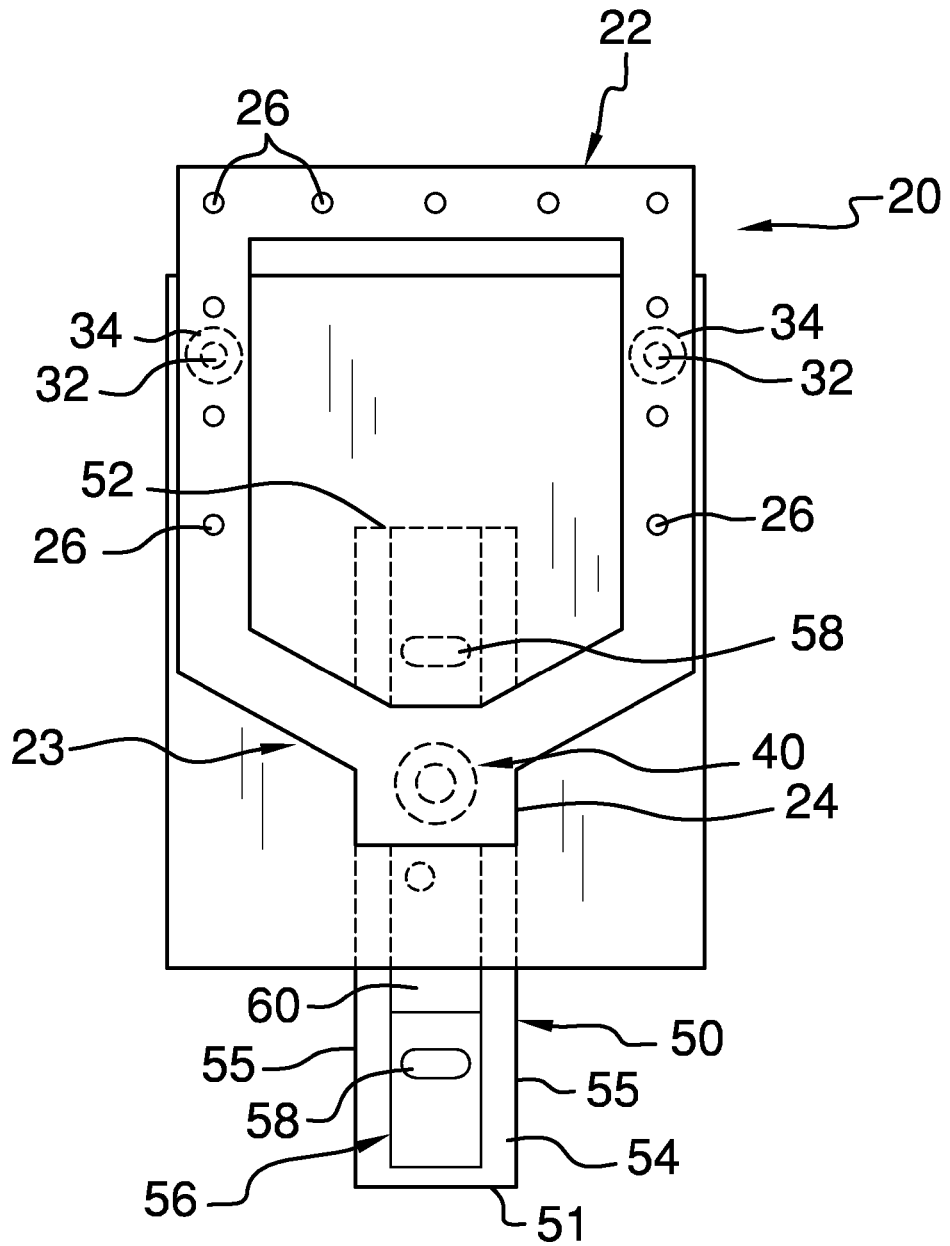
FIG. 2 is a front elevation view of the first embodiment.
Figure 9:
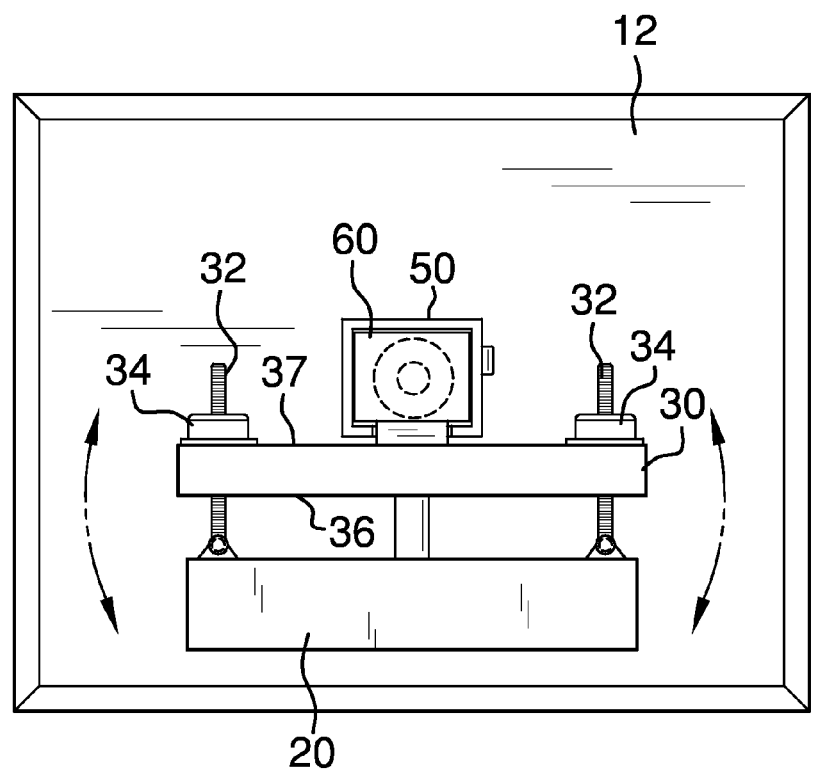
FIG. 9 is top plan view of FIG. 8.

Referring again to FIGS. 1 and 3 and also to FIGS. 2 and 9, the rectangular mount 50 has a mount first end 51 spaced apart from a mount second end 52, a back 53 spaced apart from a front 54, and a pair of spaced apart mount sides 55. The mount slot 56 is disposed within the front 54. The mount slot 56 is extended substantially from the mount first end 51 to the mount second end 52. A pair of spaced apart mount holes 58 is disposed within the mount 50 back 53.

Thereby, the mount 50 is selectively fastened to an existing external object, such as a wall for example. The plurality of spaced apart gear notches 57 is disposed within one mount side 55. The rectangular gearbox 60 is slideably disposed within the mount 50. The rectangular gearbox 60 is in communication with the pivot joint 40.

Figure 5:
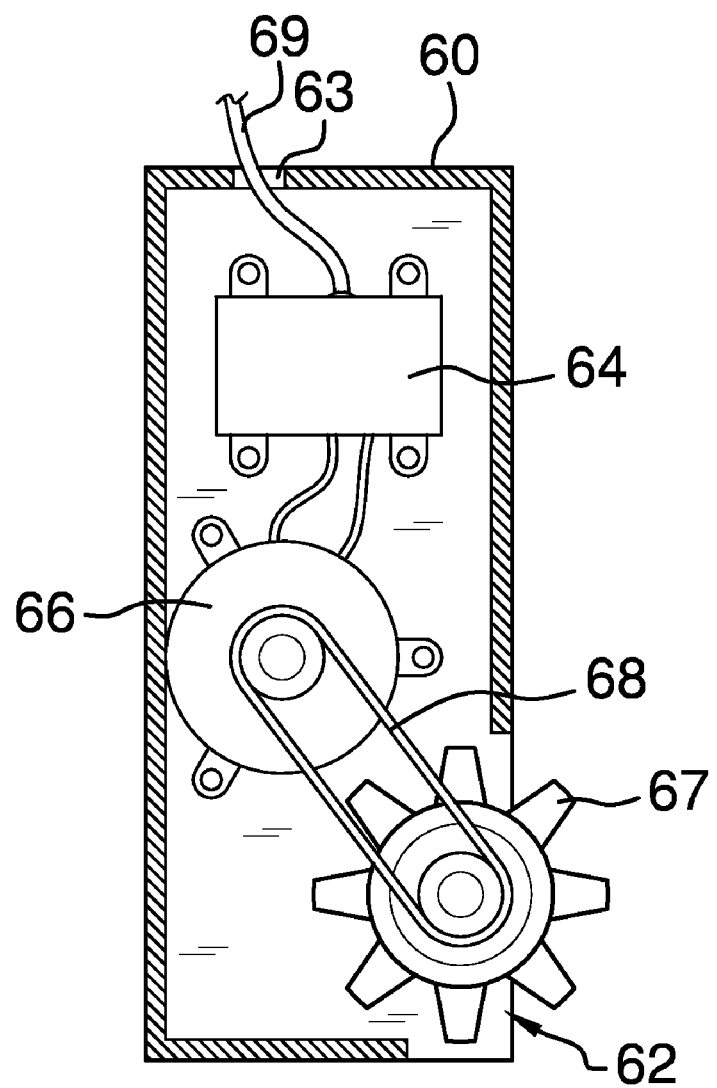
FIG. 5 is a cross sectional view of the gearbox of the first embodiment.

Referring to FIG. 5, the gearbox 60 comprises an upwardly disposed receiver 64 and the motor 66 in communication with the receiver 64. The receiver 64 is further in communication with the screw motors 34. The gear opening 62 is disposed in one side and a part of a bottom of the gearbox 60. The gear 67 is disposed within the gearbox 60 and is in communication with the motor 66 via the belt 68.. The gear 67 is partially outwardly exposed within the gear opening 62. The gear 67 is in movable engagement with the mount 50 gear notches 57, whereby the back plate 30 is selectively moved upwardly and downwardly, thereby moving the support bracket 20 upwardly and downwardly. The power cord 69 exits the gearbox 60 via the power outlet 63.

Referring again to FIGS. 1, 4, and 5, the remote 70 is in communication with the receiver 64 and the screw motors 34.

Figure 8:
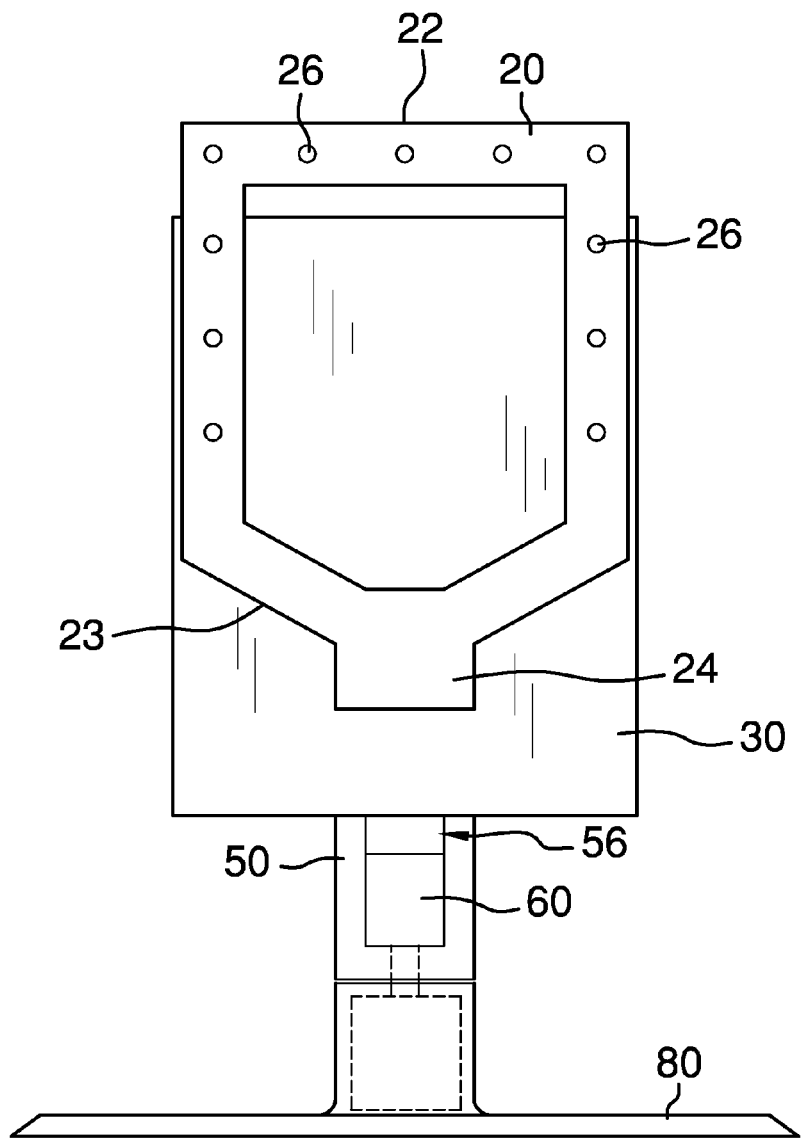
FIG. 8 is front elevation view of the first embodiment including a base.

Referring to FIG. 8, the apparatus 10 further optionally comprises the base 80 affixed to the mount first end 51, whereby the base 80 is removably placed upon a given object.

Figure 7:
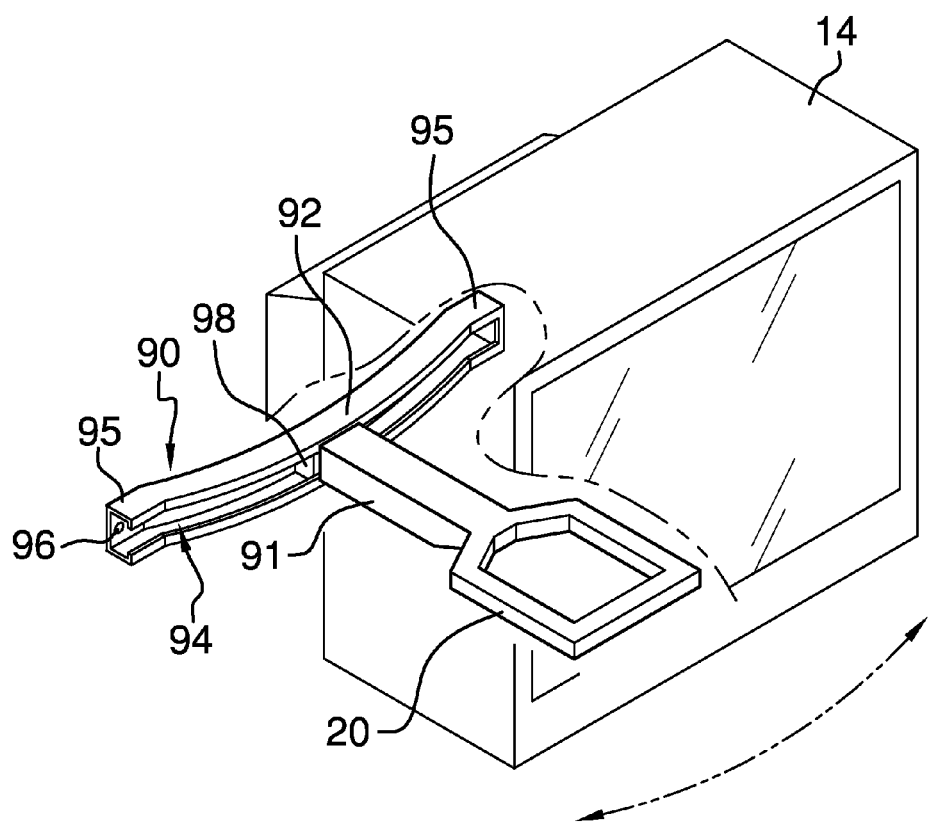
FIG. 7 is a partial cutaway view of the second embodiment of the apparatus in use with a CTR television.

Referring to FIG. 7, the alternate embodiment of the apparatus 10 is illustrated. The alternate embodiment comprises a support bracket 20 having a first end 22 spaced apart from a second end 23, and a pair of identical spaced apart sides 25. The support bracket 20 is in removable receipt of an existing CTR television 14. The long extension 91 is extended rearwardly from the support bracket 20. The channel motor 98 is affixed rearwardly to the long extension 91. The arm base 90 has a pair of spaced apart ears 95. A mount orifice 96 is disposed in each ear 95. The forwardly disposed arc 92 connects the two ears 95. The forwardly disposed channel 94 is disposed in the arc 92 and in each ear 95. The remote (FIG. 1) controls the channel motor 98 whereby the support bracket 20 is selectively moved through a plane of the arc 92 upon command of the remote 70.

With respect to the above description then, it is to be realized that the optimum dimensional relationships for the parts of the pivoting remotely controlled television holder apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the pivoting remotely controlled television holder apparatus.

Directional terms such as "front", "back", "in", "out", "downward", "upper", "lower", and the like may have been used in the description. These terms are applicable to the embodiments shown and described in conjunction with the drawings.

These terms are merely used for the purpose of description in connection with the drawings and do not necessarily apply to the position in which the pivoting remotely controlled television holder apparatus may be used.

Therefore, the foregoing is considered as illustrative only of the principles of the pivoting remotely controlled television holder apparatus. Further, since numerous modifications and changes will readily occur to those skilled in the art, it is not desired to limit the pivoting remotely controlled television holder apparatus to the exact construction and operation shown and described, and accordingly, all suitable modifications and equivalents may be resorted to, falling within the scope of the pivoting remotely controlled television holder apparatus.

What is claimed is:

1. A pivoting remotely controlled television holder apparatus comprising, in combination:
    a hollow support bracket having a first end spaced apart from a v-shaped second end, a pair of identical spaced apart sides;
    an extension extended outwardly from the v-shaped second end;
    a plurality of spaced apart orifices disposed through the first end and the pair of sides;
    whereby the orifices provide for support bracket attachment to an existing flat screen television;
    a back plate having a first side spaced apart from a second side, the back plate connected to the support bracket by a pair of identical spaced apart worm screws disposed within the support bracket sides, the back plate further connected to the support bracket by a pivot joint partially disposed within the extension;
    a screw motor disposed on each worm screw, each screw motor connected to the back plate second side;
    whereby the screw motors pivot the support bracket in the vertical plane, the screw motors further pivoting the support bracket in the horizontal plane;
    a rectangular mount having a mount first end spaced apart from a mount second end, a back spaced apart from a front, a pair of spaced apart mount sides;
    a mount slot disposed within the front, the mount slot extended substantially from the mount first end to the mount second end;
    a pair of spaced apart mount holes disposed within the mount back;
    whereby the mount is selectively fastened to an existing external object;
    a plurality of spaced apart gear notches disposed within one mount side;
    a rectangular gearbox slideably disposed within the mount, the rectangular gearbox in communication with the pivot joint, the gearbox comprising:
        an upwardly disposed receiver;
        a motor in communication with the receiver, the receiver further in communication with the screw motors;
        a gear opening disposed in a one side and a part of a bottom of the gearbox;
        a gear disposed within the gearbox, the gear partially outwardly exposed within the gear opening, the gear in movable engagement with the mount gear notches;
    whereby the back plate is selectively moved upwardly and downwardly, thereby moving the support bracket upwardly and downwardly;
    a remote in communication with the receiver and the screw motors.

2. The apparatus according to claim 1 further comprising a base affixed to the mount first end;
    whereby the base is removably placed upon a given object.

* * * * *